US012365575B2

(12) United States Patent
Cutaio et al.

(10) Patent No.: US 12,365,575 B2
(45) Date of Patent: Jul. 22, 2025

(54) SENSORIZED CONNECTOR AND CAPPING SYSTEM COMPRISING SAID CONNECTOR

(71) Applicant: PELLICONI & C. S.p.A., Ozzano dell'Emilia (IT)

(72) Inventors: Francesco Cutaio, Toscanella di Dozza (IT); Federico Morselli, Bologna (IT); Doriano Naldi, Ozzano dell'Emilia (IT)

(73) Assignee: PELLICONI & C. S.P.A., Ozzano dell-Emilia (IT)

( * ) Notice: Subject to any disclaimer, the term of this patent is extended or adjusted under 35 U.S.C. 154(b) by 0 days.

(21) Appl. No.: 18/580,995

(22) PCT Filed: Jul. 28, 2022

(86) PCT No.: PCT/IB2022/056976
§ 371 (c)(1),
(2) Date: Jan. 19, 2024

(87) PCT Pub. No.: WO2023/012611
PCT Pub. Date: Feb. 9, 2023

(65) Prior Publication Data
US 2024/0327187 A1    Oct. 3, 2024

(30) Foreign Application Priority Data
Aug. 2, 2021    (IT) .................. 102021000020795

(51) Int. Cl.
*B67B 3/26*    (2006.01)
*B67B 3/14*    (2006.01)
(52) U.S. Cl.
CPC ............... *B67B 3/264* (2013.01); *B67B 3/14* (2013.01)

(58) Field of Classification Search
CPC ... B67B 3/2066; B67B 3/2073; B67B 3/2086; B67B 3/2093; B67B 3/208; B67B 3/28; B67B 2201/10; B67B 3/264
See application file for complete search history.

(56) References Cited

U.S. PATENT DOCUMENTS 3,906,706 A * 9/1975 Conti .................... B67B 3/2066
53/345
4,511,044 A    4/1985 Connor
(Continued)

FOREIGN PATENT DOCUMENTS

DE    4117178 A1    11/1992
EP    1273551 A1    1/2003
(Continued)

OTHER PUBLICATIONS

International Search Report dated Nov. 2, 2022 from counterpart PCT App No. PCT/IB2022/056976.

*Primary Examiner* — Anna K Kinsaul
*Assistant Examiner* — Himchan Song
(74) *Attorney, Agent, or Firm* — SHUTTLEWORTH & INGERSOLL, PLC; Timothy J. Klima

(57) ABSTRACT

A sensorized connector for connecting a capping head, includes at least one main body and a body movable relative to the main body, to a spindle of an actuator, the connector including at least a first portion and a second portion, the first portion including a first coupling device configured to connect the first portion to the main body of the capping head, the second portion including a second coupling device configured to connect the second portion to the spindle of the actuator. The sensorized connector also includes: a position sensor for measuring a position value; a force sensor for measuring a force value; a transmission module, connected to the position sensor and to the force sensor for receiving (Continued)

the position and force values measured by them, and for transmitting said values.

15 Claims, 3 Drawing Sheets

(56) References Cited

U.S. PATENT DOCUMENTS

| | | | |
|---|---|---|---|
| 2008/0127611 A1* | 6/2008 | Brown | B67B 3/2066 |
| | | | 53/317 |
| 2010/0089004 A1* | 4/2010 | Data | B67B 3/2033 |
| | | | 53/317 |
| 2012/0055115 A1* | 3/2012 | Preti | B67B 3/22 |
| | | | 53/342 |
| 2022/0080605 A1* | 3/2022 | Iwasaki | B25J 15/08 |

FOREIGN PATENT DOCUMENTS

| | | | |
|---|---|---|---|
| EP | 3508830 A1 | 7/2019 | |
| EP | 3798178 A1 | 3/2021 | |
| WO | 2010127700 A1 | 11/2010 | |

\* cited by examiner

SENSORIZED CONNECTOR AND CAPPING SYSTEM COMPRISING SAID CONNECTOR

This application is the National Phase of International Application PCT/IB2022/056976 filed Jul. 28, 2022 which designated the U.S.

This application claims priority to Italian Patent Application No. 102021000020795 filed Aug. 2, 2021, which applications are incorporated by reference herein.

TECHNICAL FIELD

This invention relates to a sensorized connector for connecting a capping head to a capping machine and a capping system.

BACKGROUND ART

The prior art capping processes generally comprise the application of caps on containers, such as, for example, bottles or jars, using capping heads which deform, that is to say, shape the side wall of the cap so as to allow the sealed closing of the container.

More specifically, the capping heads apply on the side wall of the caps the desired shape necessary to close the container.

The capping head is operated by a capping machine which comprises an actuator and a spindle moved (vertically) by the actuator.

The capping head is connected to the spindle of the capping machine through a metal connector.

In particular, connectors are known which are made, for example, of steel.

Usually, the connectors are made as a single solid piece which is positioned in such a way as to connect the capping head and the capping machine.

The capping process is particularly delicate and it is necessary for it to occur under precise loading conditions so that the capping process is performed correctly in order to guarantee the sealed closure of the container.

With the connectors and capping heads currently known, it is not possible to have information regarding the process parameters relative to the capping.

Moreover, the technical support activities to assist the customer during the capping process require lengthy times and they are complicated, since the premises of the customers are generally far from those of the manufacturers of capping heads.

The need is felt for information on the quantities typical of the capping processes in order to guarantee an optimum capping process.

Moreover, the need is felt of making technical support activities simpler and faster in such a way as to communicate quickly to the customer whether the capping head is performing its task correctly.

DISCLOSURE OF THE INVENTION

The aim of the invention is to satisfy the above-mentioned needs by providing a sensorized connector which is able to provide information on the quantities typical of the capping processes and at the same time facilitate and speed up the technical support activities by the manufacturers, even remotely.

Said aims are fully achieved according to the invention as characterised in the appended claims.

The dependent claims correspond to possible different embodiments of the invention.

According to an aspect, the invention relates to a sensorized connector for connecting a capping head, equipped with at least a main body and a body movable relative to the main body, to a spindle of an actuator of a capping machine.

The spindle may be, for example, electrical, hydraulic or mechanical.

According to an aspect, the connector comprises at least a first portion and a second portion.

According to an aspect, the first portion is positioned, in use, below the second portion.

The expression "in use" means when the connector is applied to the spindle of the actuator and to the capping head.

According to an aspect, the first portion, when the connector is in use, is movable relative to the second portion along a vertical direction.

According to an aspect, the first portion comprises first coupling means.

Advantageously, the first coupling means allow the first portion to be connected to the main body of the capping head.

According to an aspect, the first coupling means of the first portion comprise a male portion configured for connecting the first portion to the capping head.

For example, the male portion may have a thread complementing a thread of the capping head.

According to an aspect, the second portion comprises second coupling means.

Advantageously, the second coupling means allow the second portion to be connected to the spindle of the actuator.

According to an aspect, the second coupling means of the second portion comprise a female portion configured to connect the second portion to the spindle of the actuator of the capping machine.

For example, the female portion may have a thread complementing a thread of the spindle.

According to an aspect of the invention, the connector comprises a position sensor for detecting a position value.

The position sensor is, for example, an infrared sensor or a laser sensor.

Advantageously, providing the connector with a position sensor makes it possible to detect the movement of the movable body of the capping head during the capping process.

According to an aspect of the invention, the connector comprises a force sensor for measuring a force value.

The force sensor is, for example, a load cell.

Advantageously, the presence of a force sensor makes it possible to measure the force exchanged between the first and second portions.

Advantageously, the force sensor makes it possible to measure the load which is applied during the capping to the capping head; in fact, the first portion is, in use, integral with the capping head and therefore the force exchanged between the first portion and the second portion is equivalent to the force exchanged between the capping head and the second portion.

According to an aspect, the force sensor must undergo calibration for optimum operation.

According to an aspect, the connector comprises a transmission module, connected to the position sensor and to the force sensor, which receives the position and force values measured by the sensors and transmits the values.

The transmission module may be a wireless module, such as, for example, a Wi-Fi module.

The transmission module may transmit the position and/or force values to any electronic device configured to communicate with it, that is, to receive these values.

Advantageously, having information on the loads applied and on the movements of the movable body of the capping head allows the load-move graphs to be prepared over time during the capping process.

This advantageously makes it possible to assess any faults in the capping process, that is to say, deviations from the desired load-movement profiles.

Advantageously, knowing the values measured by the force and position sensor thus makes it possible to assess how the capping process is being performed.

According to an aspect, the values measured may be transmitted to an external receiving unit such as, for example, a PC, a remote processor or any other type of electronic unit.

Advantageously, having a transmission module which sends the values measured by the force and position sensor makes it possible to assess how the capping process is proceeding even remotely.

Advantageously, knowing how to proceed with the capping process remotely facilitates the technical support activities by the manufacturers of capping heads, who can communicate quickly with the customers in the event of malfunctions or improvement modifications to be made.

According to an aspect, the data may be measured continuously or intermittently, taking sample measurements by means of the sensors.

According to an aspect, the force sensor is interposed between the first portion and the second portion to measure a force exchanged between the first portion and the second portion.

According to an aspect, the position sensor is associated with the first portion and is oriented in the direction of the capping head in such a way as to measure a position of the movable body and its movement.

It should be noted that, since the first portion is, in use, fixed as one with the main body of the capping head, measuring the position of the movable body relative to the first portion is equivalent to measuring the position of the movable body relative to the main body.

During the capping process, the force sensor is also in contact with the second portion.

According to an aspect, the first portion has a shoulder portion.

According to an aspect, the second portion has a portion protruding radially.

According to an aspect, the portion protruding radially protrudes towards the inside of the connector. In other words, the protruding portion radially protrudes towards the first portion.

According to an aspect, the first portion moves relative to the second portion between a rest position and an end of stroke position.

According to an aspect, when the first portion is in the rest position, the shoulder portion of the first portion is in contact with the radially protruding portion of the second portion due to gravity.

According to an aspect, the second portion of the sensorized connector comprises a locking element which defines a limit stop for the relative movement between the first portion and the second portion.

According to an example, the first portion has a first cavity.

The force sensor and/or the position sensor may be present inside the first cavity.

According to another example, the first portion has a first cavity and a second cavity.

In use, the first cavity is positioned below the second cavity.

According to an aspect, the first cavity is divided from the second cavity by a separating wall.

Inside the first cavity there is the position sensor which is oriented in the direction of the capping head (to measure, as already mentioned, the position of the movable body), whilst inside the second cavity there is the force sensor which measures the force exchanged between the first portion and the second portion.

According to an aspect, the second portion may have a housing cavity.

According to an example, the transmission module is positioned inside the housing cavity.

According to an aspect, the connector may comprise a battery associated with the transmission module, for powering it.

According to an aspect, the battery is positioned inside the housing cavity.

According to an aspect, the connector may comprise a cap element positioned in the housing cavity and configured to render the cavity impermeable.

Advantageously, the presence of a cap element which makes the housing cavity impermeable makes it possible to protect any element positioned inside the housing cavity, for example the battery and/or the transmission module.

According to an aspect, the second portion may comprise a first element and a second element which can be coupled to each other, wherein the second element has the housing cavity. In this case, the force sensor is in contact with the second element which makes up the second portion.

According to an aspect, the first and second elements may be integrally coupled.

According to an aspect, the first and second elements may be coupled by screws.

According to an aspect, the connector may comprise a transparent element (for the wavelength in use by the position sensor, for example laser and/or infrared) positioned, in use, below the first portion.

According to an aspect, the invention relates to a capping system which comprises:
- a capping head,
- a spindle of an actuator,
- a sensorized connector according to any one of the above-mentioned aspects for connecting the spindle of the actuator to the capping head.

According to an aspect, the capping head comprises at least one main body, which extends along a main axis of extension and a body movable relative to the main body along the main axis of extension.

According to an aspect, the capping head comprises a plurality of capping ends positioned at a first end of the main body.

According to an aspect, the capping head comprises a capping ring, outside the main body, which is movable which translates along the main axis of extension.

Advantageously, the movement of the capping ring allows the capping ends to be deformed and the capping of containers such as bottles or cans to be performed.

According to an aspect, the capping head comprises a spring operatively connected to the movable body, both the spring and the movable body are positioned inside the main body.

BRIEF DESCRIPTION OF DRAWINGS

These and other features are more apparent from the following description of a preferred embodiment, illustrated by way of non-limiting example in the accompanying drawings, in which.

DETAILED DESCRIPTION OF PREFERRED EMBODIMENTS OF THE INVENTION

Figure 1:
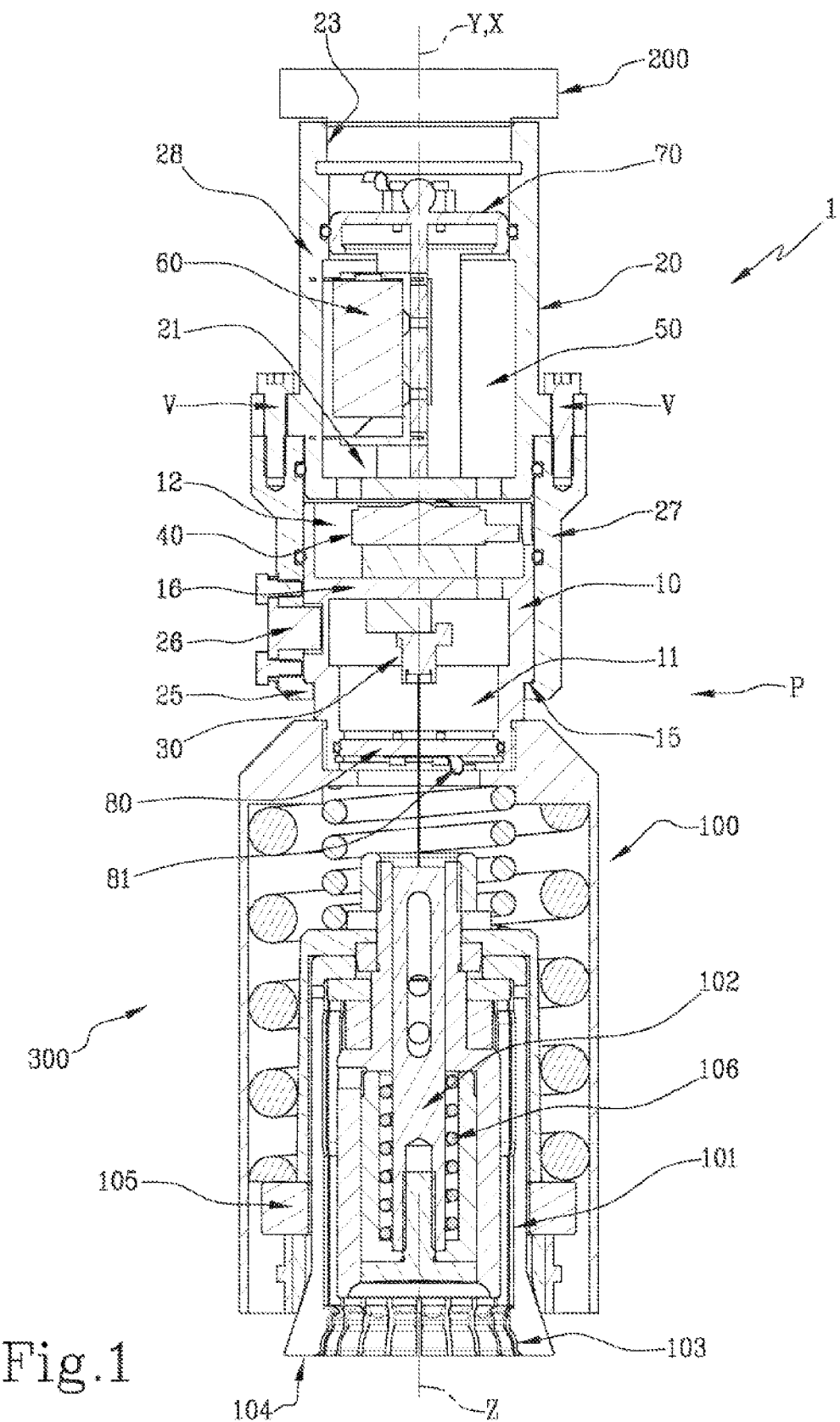
FIG. 1 is a schematic cross section of an embodiment of a sensorized connector in use, connected to a capping head.

The invention relates to a sensorized connector 1 for connecting a capping head 100 to a spindle of an actuator 200 (illustrated schematically in FIG. 1).

The capping head 100 is equipped with at least a main body 101 and a body 102 movable relative to the main body 101.

The connector 1 has a main direction of extension X.

The connector 1 comprises at least a first portion 10 and a second portion 20.

The first portion 10 is positioned between the second portion 20 and the capping head 100.

In other words, the first portion 10 is positioned, in use, below the second portion.

The expression "in use" means the connector connected to the spindle of the actuator 200 and to the capping head 100.

The first portion 10 is movable, in use, relative to the second portion 20 along a vertical direction Y.

In other words, the first portion 10 is movable relative to the second portion 20 along a main direction X of the connector between a rest position p (illustrated in FIG. 1) and an end of stroke position (not illustrated in the accompanying drawings).

The connector 1 may be made of various materials, for example metal material, preferably steel (preferably stainless).

The connector comprises a position sensor 30 directed in such a way as to measure a position value of the movable body 102 of the capping head 100.

In other words, the position sensor 30 is associated with the first portion 10 and is oriented in the direction of the capping head 100.

According to an embodiment, the position sensor 30 is an infrared sensor.

According to another embodiment, the position sensor 30 is a laser sensor.

The position sensor 30 must be suitably calibrated.

Advantageously, the position sensor 30 makes it possible to measure the movement of the movable body 102 during the entire capping process.

The connector comprises a force sensor 40 which measures a force value.

The force sensor 40 is interposed between the first portion 10 and the second portion 20.

Advantageously, the force sensor 40 makes it possible to measure the force exchanged between the first and second portions (10, 20).

Advantageously, the force sensor 40 makes it possible to measure the load which is applied during the capping to the capping head 100.

The force sensor 40 measures a position value for measuring a force exchanged between the first portion 10 and the second portion 20.

According to an embodiment, the force sensor 40 is a load cell.

For example, the force sensor 40 may be a force transducer, an extensometer.

The force sensor 40 must be suitably calibrated.

According to an embodiment, the first portion 10 has a first cavity 11 in which the force position sensor 40 and/or the position sensor 30 is positioned.

According to another embodiment, the first portion 10 has a first cavity 11 and a second cavity 12, in which the position sensor 30 and force sensor 40 are positioned, respectively.

The first cavity 11 is positioned below the second cavity 12 considering the connector 1 in use.

In other words, the first cavity 11 is situated between the second cavity 12 and the capping head 100 along a main direction of extension X of the connector 1.

The connector 1 comprises a separating wall 16.

The separating wall 16 delimits the first cavity 11 from the second cavity 12.

According to an embodiment, the connector 1 comprises an element 80 associated with the first portion.

The transparent element 80 delimits the first cavity 11 below, considering the connector in use.

Advantageously, the transparent element 80 prevents liquids from entering the first portion, damaging the sensors present inside.

The transparent element 80 may be associated with metal segments 81, for example in the form of a crescent, which act as a contact sensor.

The metal segments 81 allow a contact signal to be sent (when the metal segments 81 enter into contact with the elements of the capping head 100 below), which may be, for example, advantageously used to start the measurement or indicate a time interval of interest of the measurement.

The connector 1 comprises a transmission module 50 connected to the position sensor 30 and to the force sensor 40.

The transmission module 50 receives and transmits the position and force values measured by the position sensor 30 and by the force sensor 40.

The position and force values, sent by the transmission module 50, can be received from a remote processor such as, for example, a PC.

According to an embodiment, the transmission module 50 is a wireless module (preferably Wi-Fi).

According to another embodiment, the transmission module 50 is a Bluetooth module.

Advantageously, the transmission module 50 can send the values measured by the force and position sensor to a remote processor allowing the progress of the capping process to be assessed even remotely.

Advantageously, knowing the loads applied and the movement of the movable body 102 of the capping head 100 makes it possible to obtain load-movement graphs for assessing the trend of the capping process.

Advantageously, the transmission module 50 makes it possible to facilitate the technical support activities by the suppliers of capping heads, since it is possible to provide remotely, in a particularly simple and fast manner, process parameters regarding capping (e.g. loads/position of the movable element). In this way, the diagnosis and the remote support of malfunctions/faults is facilitated.

According to an embodiment, the second portion 20 has at least one housing cavity 21.

According to an embodiment, the transmission module 50 is positioned inside the housing cavity 21.

The connector 1, according to an embodiment, comprises a battery module 60 associated with the transmission module 50.

The battery 60 may be housed inside the housing cavity 21.

The first portion 10 comprises first coupling means 13 configured to connect the first portion 10 to the capping head 100.

Figure 2:
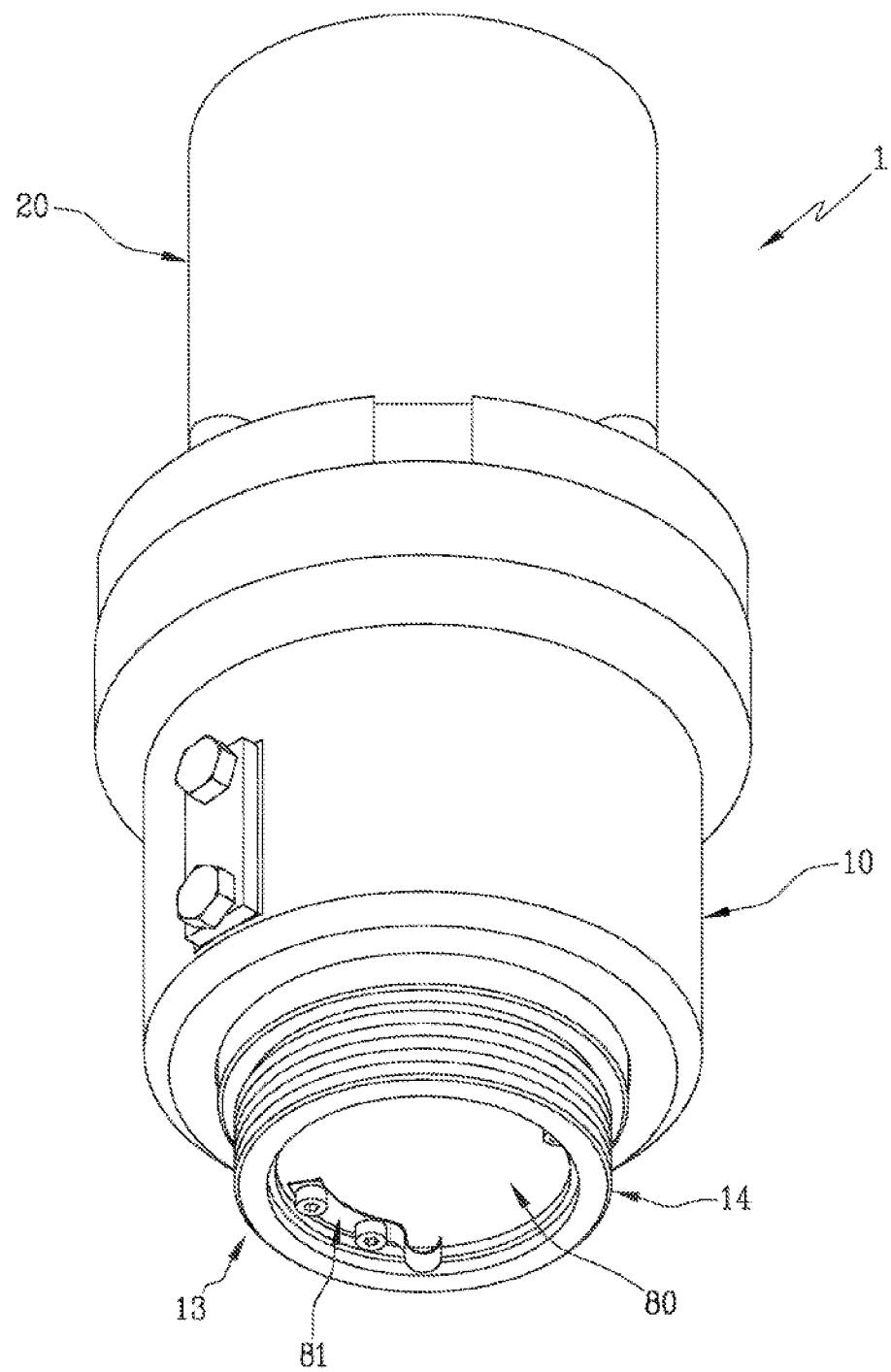
FIG. 2 is a perspective view of a sensorized connector.

According to an embodiment, as illustrated in FIG. 2, the first coupling means 13 comprise a threaded male portion 14 configured for connecting the first portion 10 to the capping machine 100.

The second portion 20 comprises second coupling means 23 configured for connecting the connector 1 to the spindle of the actuator 200.

Figure 3:
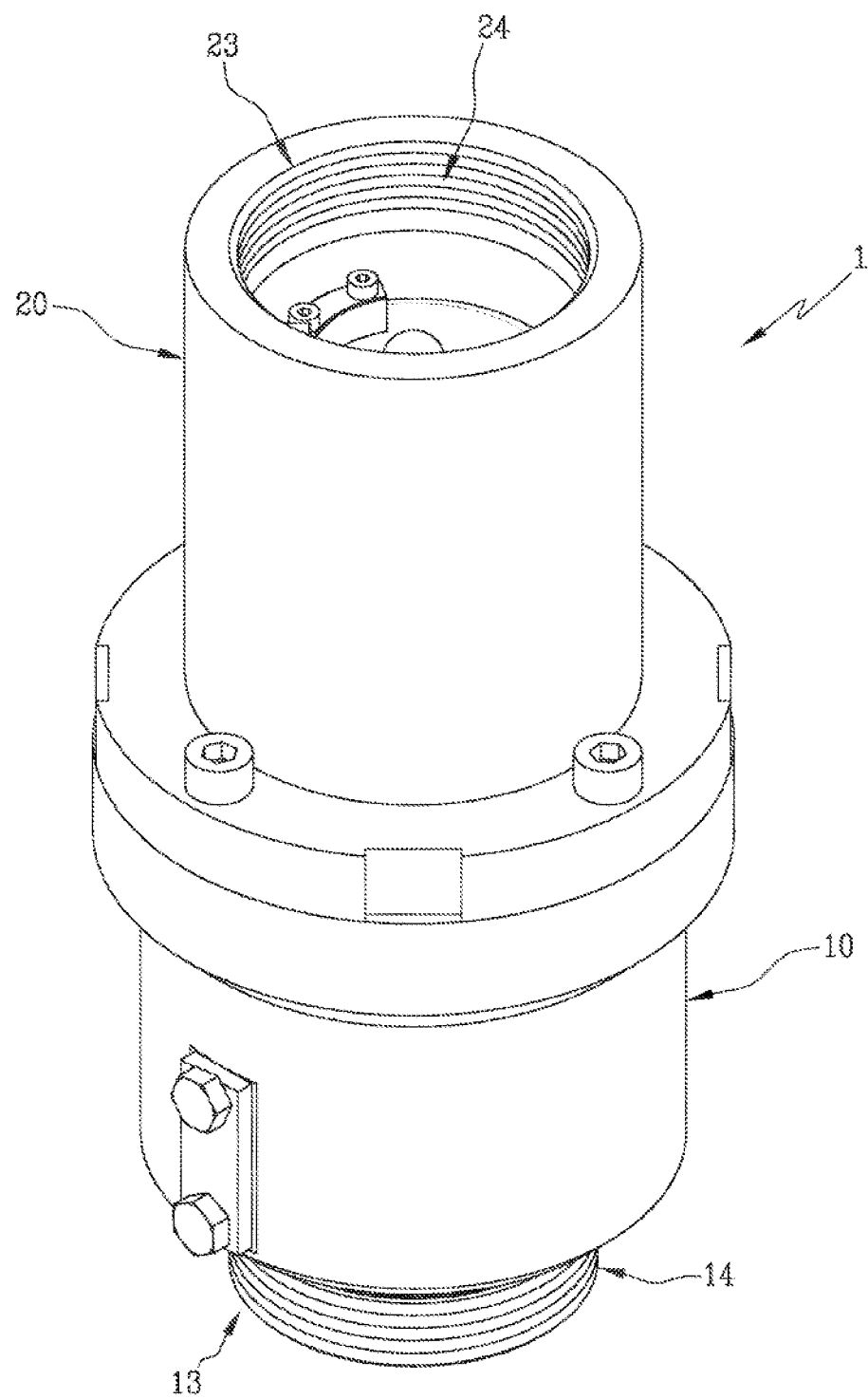
FIG. 3 is a perspective view of a sensorized connector.

According to an embodiment, as illustrated in FIG. 3, the second coupling means 23 comprise a female portion 24 configured for connecting the second portion 20 to the spindle of the actuator 200.

According to an embodiment, the connector 1 may comprise a cap 70 which can be coupled to the second portion 20.

The cap 70 is configured to make the housing cavity 21 impermeable.

The cap 70 must guarantee to the electrical material, contained in the housing cavity, a suitable IP protection rating.

Advantageously, the presence of a cap 70 which makes the housing cavity 21 impermeable makes it possible to protect any element located inside the housing cavity 21, for example the battery 50 and/or the transmission module 60.

According to another embodiment not illustrated, the second portion 20 may comprise a first and a second door.

Advantageously, the presence of the first door allows for any replacement of the battery and the second door, when open, allows the wireless signal to pass without attenuation towards the outside of the connector.

The first portion 10 comprises a shoulder portion 15.

The second portion 20 comprises a radially protruding portion 25 which can be coupled to the shoulder portion 15.

The radially protruding portion 25 protrudes towards the inside of the connector 1, that is, towards the first cavity 11.

As illustrated in FIG. 1, considering the connector 1 in use and in the rest position p, the shoulder portion 15 is in contact, due to the action of gravity, with the radially protruding portion 25.

The first portion 10 can move relative to the second portion 20 until the first portion 10 comes into contact with a locking element 26 forming part of the second portion 20.

The locking element 26 defines, in other words, a maximum stroke limit stop for the relative movement between the first portion 10 and the second portion 20.

According to an embodiment, the second portion 20 comprises a first element 27 and a second element 28 which can be coupled to each other.

The first element 27 and the second element 28 may be integrally coupled.

As illustrated in FIG. 1, the first element 27 and the second element 28 may be coupled by screws.

The invention relates to a capping system 300 comprising:
a capping head 100 which comprises at least one main body 101, which extends along a main axis of extension Z and a body 102 movable relative to the main body 101 along the main axis of extension Z,
a spindle of an actuator 200,
a sensorized connector 1 according to any one of the above-mentioned features, configured for connecting the spindle of the actuator 200 to the capping head 100.

Advantageously, the capping system 300 described above allows the containers to be capped in a particularly secure manner, that is to say, with a high degree of sealing.

According to an embodiment, the capping head 100 comprises a plurality of capping ends 103 positioned at a first end 104 of the main body.

The capping head 100 also comprises a capping ring 105, outside the main body 101.

The capping ring 105 is movable along the main axis of extension Z and deforms the capping ends 103 translating along the main axis of extension Z.

Advantageously, the movement of the capping ring 105 allows the capping ends to be deformed and the capping of containers such as bottles or cans to be performed.

The capping head 100 comprises a spring 106 operatively connected to the movable element 102.

Both the spring 106 and the movable element 102 are positioned inside the main body 101 of the capping head 100.

The capping head 100 is described in prior patent document EP3798178A1 in the name of the same Applicant, the content of which is incorporated herein by reference in this description.

In particular, but without limiting the scope of the invention, all the features described in patent EP3798178A1 relative to the main body, plurality of capping ends, capping ring are deemed to be incorporated by reference.

According to patent document EP3798178A1, the movable body 102 of the capping head 100 is defined as "first piston".

All the features of the "first piston" according to patent document EP3798178A1 are therefore incorporated herein by reference with regard to the movable body 102.

According to patent document EP3798178A1, the spring 106 of the capping head 100 is referred to as "first spring".

All the features of the "first spring" according to patent document EP3798178A1 are therefore incorporated herein by reference with regard to the spring 106.

According to patent document EP3798178A1, the main axis of extension Z of the capping head 100 is defined as "longitudinal axis".

All the features of the "longitudinal axis" of patent document EP3798178A1 are therefore incorporated herein by reference with regard to the main axis of extension Z.

The invention claimed is:

1. A sensorized connector for connecting a capping head, including at least a main body and a movable body movable relative to the main body, to a spindle of an actuator, the sensorized connector comprising:
at least a first portion and a second portion,
the first portion being positioned, in use, below the second portion,
the first portion being movable, in use, relative to the second portion along a vertical direction,
the first portion comprising a first coupling configured to connect the first portion to the main body of the capping head,
the second portion comprising a second coupling configured to connect the second portion to the spindle of the actuator;
a position sensor for measuring a position value;
a force sensor for measuring a force value;
a transmission module, connected to the position sensor and to the force sensor for receiving the position and force values measured by the position sensor and the force sensor, and for transmitting said position and force values;

the force sensor being interposed between the first portion and the second portion for measuring a force exchanged between the first portion and the second portion, the position sensor being operatively connected to the first portion and oriented in a direction of the capping head, for measuring a position of the movable body.

2. The sensorized connector according to claim 1, wherein the first portion has a first cavity and wherein the force sensor and/or the position sensor is positioned inside the first cavity.

3. The sensorized connector according to claim 1, wherein the first portion has a first cavity and a second cavity and wherein the position sensor is positioned inside the first cavity and the force sensor is positioned inside the second cavity.

4. The sensorized connector according to claim 1, wherein the second portion has a housing cavity and wherein the transmission module is positioned inside the housing cavity.

5. The sensorized connector according to claim 4, and further comprising a cap coupled to the second portion and configured to make the housing cavity impermeable.

6. The sensorized connector according to claim 4, and further comprising a battery, operatively connected to the transmission module for powering the transmission module.

7. The sensorized connector according to claim 6, wherein the battery is positioned inside the housing cavity of the second portion.

8. The sensorized connector according to claim 1, wherein the first coupling comprises a male portion configured for connecting the first portion to the capping head.

9. The sensorized connector according to claim 1, wherein the second coupling comprises a female portion configured for connecting the second portion to the spindle of the actuator.

10. The sensorized connector according to claim 1, wherein the first portion comprises a shoulder portion and the second portion comprises a radially protruding portion, said shoulder portion being in contact with said radially protruding portion in a rest position.

11. The sensorized connector according to claim 1, wherein the second portion comprises a first element and a second element coupled to each other.

12. The sensorized connector according to claim 1, wherein the force sensor is a load cell.

13. The sensorized connector according to claim 1, wherein the position sensor is an infrared sensor or a laser sensor.

14. A capping system comprising:
a capping head comprising at least a main body, which extends along a main axis of extension and a movable body movable relative to the main body along said main axis of extension,
a spindle of an actuator,
the sensorized connector according to claim 1, configured for connecting the spindle of the actuator to the capping head.

15. The capping system according to claim 14, wherein the capping head comprises
a plurality of capping ends positioned at a first end of the main body,
a capping ring, outside the main body, movable along the main axis of extension which deforms the capping ends translating along the main axis of extension,
a spring operatively connected to the movable body, the spring and the movable body being positioned inside the main body.

* * * * *